(12) United States Patent
Park et al.

(10) Patent No.: US 10,754,225 B2
(45) Date of Patent: Aug. 25, 2020

(54) LENS DRIVING MECHANISM, CAMERA MODULE, AND OPTICAL DEVICE

(71) Applicant: LG INNOTEK CO., LTD., Seoul (KR)

(72) Inventors: Jae Keun Park, Seoul (KR); Tae Min Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/096,469

(22) PCT Filed: Apr. 28, 2017

(86) PCT No.: PCT/KR2017/004539
§ 371 (c)(1),
(2) Date: Oct. 25, 2018

(87) PCT Pub. No.: WO2017/188771
PCT Pub. Date: Nov. 2, 2017

(65) Prior Publication Data
US 2019/0137844 A1    May 9, 2019

(30) Foreign Application Priority Data

Apr. 28, 2016 (KR) .................. 10-2016-0052201
Apr. 28, 2016 (KR) .................. 10-2016-0052208

(51) Int. Cl.
*G03B 9/06* (2006.01)
*G03B 13/36* (2006.01)
(Continued)

(52) U.S. Cl.
CPC ............... *G03B 9/06* (2013.01); *G02B 5/20* (2013.01); *G02B 7/02* (2013.01); *G02B 7/09* (2013.01);
(Continued)

(58) Field of Classification Search
CPC .... H04N 5/238; H04N 5/2254; H04N 5/2253; H04N 5/2252; G03B 9/06; G03B 17/02;
(Continued)

(56) References Cited

U.S. PATENT DOCUMENTS

2005/0207744 A1* 9/2005 Yano .................. G02B 7/102
396/55
2007/0110424 A1* 5/2007 Iijima ................. H04N 5/2257
396/133
(Continued)

FOREIGN PATENT DOCUMENTS

JP    2006-317808 A    11/2006
JP    2012-047824    *  3/2012 ............... G03B 5/00
(Continued)

OTHER PUBLICATIONS

Office Action dated Apr. 11, 2019 in European Application No. 17789955.6.
(Continued)

*Primary Examiner* — Lin Ye
*Assistant Examiner* — John H Morehead, III
(74) *Attorney, Agent, or Firm* — Saliwanchik, Lloyd & Eisenschenk

(57) ABSTRACT

An embodiment of the present invention relates to a camera module comprising: a housing; a bobbin arranged inside the housing; a first magnet arranged on the bobbin; a first coil arranged in the housing and facing the first magnet; a plurality of lenses attached to the bobbin; and an iris unit coupled to the bobbin, wherein the plurality of lenses comprises a first lens and a second lens distanced from each other, and at least a portion of the iris unit is positioned between the first lens and the second lens.

20 Claims, 9 Drawing Sheets

(51) Int. Cl.
    *H04N 5/225*     (2006.01)
    *H04N 5/238*     (2006.01)
    *G02B 5/20*     (2006.01)
    *G03B 3/10*     (2006.01)
    *G02B 7/09*     (2006.01)
    *G03B 7/085*     (2006.01)
    *G02B 7/02*     (2006.01)
    *G03B 7/12*     (2006.01)
    *G03B 17/02*     (2006.01)

(52) U.S. Cl.
    CPC .............. *G03B 3/10* (2013.01); *G03B 7/085* (2013.01); *G03B 7/12* (2013.01); *G03B 13/36* (2013.01); *G03B 17/02* (2013.01); *H04N 5/2252* (2013.01); *H04N 5/2253* (2013.01); *H04N 5/2254* (2013.01); *H04N 5/238* (2013.01)

(58) Field of Classification Search
    CPC .......... G03B 13/36; G03B 7/12; G03B 7/085; G03B 3/10; G02B 5/20; G02B 7/09; G02B 7/02
    See application file for complete search history.

(56) References Cited

U.S. PATENT DOCUMENTS

| | | | |
|---|---|---|---|
| 2011/0206365 A1* | 8/2011 | Yoo | G03B 9/14 396/463 |
| 2015/0212291 A1* | 7/2015 | Lee | G02B 7/08 348/360 |
| 2015/0253583 A1* | 9/2015 | Cho | G02B 27/646 348/360 |

FOREIGN PATENT DOCUMENTS

| | | |
|---|---|---|
| JP | 2012-47824 A | 3/2012 |
| KR | 10-2005-0057708 A | 6/2005 |
| KR | 10-2010-0048361 A | 5/2010 |
| KR | 10-1261685 B1 | 5/2013 |
| KR | 10-2013-0124620 A | 11/2013 |
| WO | WO-2009/020696 A1 | 2/2009 |

OTHER PUBLICATIONS

International Search Report in International Application No. PCT/KR2017/004539, filed Apr. 28, 2017.

* cited by examiner

LENS DRIVING MECHANISM, CAMERA MODULE, AND OPTICAL DEVICE

CROSS-REFERENCE TO RELATED APPLICATION

This application is the U.S. national stage application of International Patent Application No. PCT/KR2017/004539, filed Apr. 28, 2017, which claims priority to Korean Application Nos. 10-2016-0052201, filed Apr. 28, 2016; and 10-2016-0052208, filed Apr. 28, 2016, the disclosures of each of which are incorporated herein by reference in their entirety.

TECHNICAL FIELD

The teachings in accordance with exemplary and non-limiting embodiments of this invention relate generally to a lens driving mechanism, a camera module, and an optical device.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, a camera module photographing a subject in a picture or a video may be mentioned. Recently, even in mobile markets and small camera markets, needs to realize a DSLR (Digital Single Lens Reflex Camera) level iris are on the increase.

To this end, a method using a variable iris has been newly surfaced using an iris actuator on a camera module. Thus, a technology for connecting an iris actuator without an iris signal connecting line for driving an AF (Auto Focus) is required.

DETAILED DESCRIPTION OF THE INVENTION

Technical Subject

In order to solve the aforementioned problem, an exemplary embodiment of the present invention is to provide a lens driving mechanism in which an iris is integrally formed with a bobbin while a lens driving mechanism is interposed between the iris and an auto focus driving part in order to evade a magnetic interference.

An exemplary embodiment of the present invention is to provide a lens driving mechanism including a structure in which an iris actuator can be connected to auto focus-driving iris signal connecting line without interference.

Furthermore, an exemplary embodiment is to provide a camera module including a lens driving mechanism and an optical device.

Technical Solution

A lens driving mechanism according to an exemplary embodiment of the present invention may comprise: a housing; a bobbin coupled with a lens module and discretely disposed from the housing: a first driving part disposed at the bobbin; a second driving part disposed at the housing and facing the first driving part; and an iris unit coupled with the bobbin, wherein the bobbin includes an iris receptor accommodating at least a portion of the iris unit.

The iris receptor may be formed by a portion of an upper surface of the iris receptor being recessed downwardly.

The iris receptor may be formed by a portion of a lateral surface at one side of the bobbin being recessed to the other side.

The iris unit may integrally move with the bobbin.

The bobbin may include a lens receptor formed at an inside of the bobbin, wherein the lens receptor may include a first receptor accommodated by a first lens group of the lens module, and a second receptor accommodated by a second lens group of the lens module, and wherein the iris receptor may be interposed between the first receptor and the second receptor.

The iris unit may include a third driving part, a fourth driving part facing the third driving part, and first and second blades interacting with the third driving part, wherein the first and second blades can adjust an amount of light passing through the lens module in response to movement of the third driving part.

The lens driving mechanism may further comprise a support member coupled to the bobbin and the housing, wherein the support member may include a flexible first substrate.

The flexible first substrate may include a first coupling part coupled to an upper surface of a bottom plate of the housing, a second coupling part coupled to a lower surface of bobbin, and a connection part connecting the first coupling part and the second coupling part, wherein the connection part may be bent at least twice.

The second coupling part ma include a body part coupled with the bobbin, and a mounting part upwardly bent by being extended from the body part, wherein the mounting part may be disposed with a first sensor part detecting the third driving part.

The lens driving mechanism may further comprise a second substrate electrically connected to the second driving part and disposed at the housing, and the first substrate may be electrically connected to the fourth driving part and the second substrate may be spaced apart from the first substrate.

The lens driving mechanism may further comprise a second sensor part disposed at the second substrate to detect the first driving part.

The lens driving mechanism may further comprise the bobbin and a guide ball contacting the housing, The lens driving mechanism according to an exemplary embodiment may comprise: a housing; an iris unit discretely disposed from the housing; a first driving part disposed at the iris unit; a second driving part disposed at the housing to face the first driving part; and a support member coupled to the housing and the iris unit, wherein the iris unit may be accommodated by a lens module.

The iris unit may include a third driving part, a fourth driving part facing the third driving part, and first and second blades interacting with any one of the third driving part and the fourth driving part to adjust an amount of light having passed the lens module.

The iris unit may include a first receptor accommodated by a first lens group of the lens module and a second receptor accommodated by a second lens group of the lens module, wherein the first and second blades may be interposed between the first and second receptors.

The support member may include a flexible PCB (FPCB, Flexible Printed Circuit Board).

The lens driving mechanism may further comprise: a substrate disposed at the housing to be electrically connected to the second driving part; a first sensor part disposed at the FPCB to detect any one or more of the third driving part and the fourth driving part; and a second sensor part disposed at the substrate to detect the first driving part.

The lens driving mechanism may further comprise: a guide ball contacting the iris unit and the housing.

A camera module according to an exemplary embodiment of the present invention may comprise: a housing; a bobbin coupled by a lens module and discretely disposed from the housing; a first driving part disposed at the bobbin; a second driving part disposed at the housing to face the first driving part; and an iris unit coupled with the bobbin, wherein the bobbin may include an iris receptor accommodating at least a portion of the iris unit.

An optical device according to an exemplary embodiment may comprise: a housing; a bobbin coupled by a lens module and discretely disposed from the housing; a first driving part disposed at the bobbin; a second driving part disposed at the housing to face the first driving part; and an iris unit coupled to the bobbin, wherein the bobbin may include an iris receptor accommodating at least a portion of the iris unit.

A lens driving mechanism according to an exemplary embodiment may comprise: a housing; a bobbin spaced apart from the housing; a first driving part disposed at the bobbin; a second driving part disposed at the housing to face the first driving part; an iris unit disposed at the bobbin, and a support member coupled to the housing, wherein the support member may be formed with a flexible circuit substrate.

The support member may include a first coupling part coupled with the housing, a second coupling part coupled with the bobbin, and a connection part connecting the first coupling part and the second coupling part.

The housing may include a first lateral surface part and a second lateral surface part to face the first lateral surface part, wherein the bobbin may include a first lateral part to face the first lateral surface part and a second lateral part to face the second lateral surface part, and wherein the first coupling part may be coupled with the first lateral surface part of housing and the second coupling part may be coupled with the second lateral part of bobbin.

The connection part may include a first extension part extended from the first coupling part to a second coupling part side, a second extension part extended to a first coupling part side by being bent from the first extension part, and a third extension part extended to the second coupling part by being bent from the extension part.

The first coupling part may include first and second coupling bodies, each body mutually spaced apart from the other body, wherein the connection part may include first and second connection bodies each body mutually spaced apart from the other body, and wherein the first connection body may connect the first coupling body and the second coupling part, and the second connection body may connect the second coupling body and the second coupling part.

The first coupling part may include a body part coupled to an upper surface of bottom plate of housing and a terminal part extended from the body part by being downwardly bent, wherein the second coupling part may include a body part coupled to a lower surface of bobbin and a mounting part extended from the body part by being upwardly bent.

The iris unit may include a third driving part, a fourth driving part facing the third driving part and first and second shutter parts interacting with the third driving part, wherein the first and second shutter parts may be moved to mutually opposite direction by movement of the third driving part.

The mounting part may be disposed with a sensor part detecting a position of the third driving part.

The lens driving mechanism may further comprise a substrate electrically connected with the second driving part and disposed at the housing, wherein the support member may be electrically connected with the fourth driving part and the substrate may be spaced apart from the support member.

The lens driving mechanism may further comprise a guide ball contacted with the bobbin and the housing.

A camera module according to an exemplary embodiment of the present invention may comprise: a housing; a bobbin so positioned as to be spaced apart from the housing; a first driving part disposed at the bobbin; a second driving part disposed at the housing to face the first driving part; an iris unit disposed at the bobbin, and a support member coupled with the bobbin and the housing, wherein the support member may be formed with a flexible circuit substrate.

An optical device according to an exemplary embodiment may comprise: a housing; a bobbin so positioned as to be spaced apart from the housing; a first driving part disposed at the bobbin; a second driving part disposed at the housing to face the first driving part; an iris unit disposed at the bobbin, and a support member coupled to the bobbin and the housing, wherein the support member may be formed with a flexible circuit substrate.

A camera module according to an exemplary embodiment may comprise: a housing; a bobbin disposed within the housing; a first magnet disposed at the bobbin; a first coil disposed at the housing to face the first magnet; a plurality of lenses coupled with the bobbin; and an iris unit coupled with the bobbin, wherein the plurality of lenses may include a first lens and a second lens, each lens spaced apart from the other lens, and wherein at least a portion of the iris unit may be interposed between the first lens and the second lens.

The camera module may further comprise: a PCB disposed underneath the housing; and an image sensor coupled to the PCB and disposed underneath the plurality of lenses, wherein the first lens may be disposed at an upper side of the iris unit and the second lens may be interposed between the iris unit and the image sensor.

The plurality of lenses may further include a third lens interposed between the first lens and the iris unit and a fourth lens interposed between the second lens and the image sensor.

The bobbin may include an iris receptor accommodating at least a portion of the iris unit, and the iris unit accommodated into the iris receptor may integrally move with the bobbin.

The iris receptor may be formed by a portion of lateral surface at one side of bobbin being recessed to the other side.

The bobbin may further include a lens receptor formed at an inside of the bobbin, wherein the lens receptor may include a first receptor accommodating the first lens and a second receptor accommodating the second lens, and wherein the iris receptor may be interposed between the first receptor and the second receptor.

The iris unit may include a second magnet, a second coil facing the second magnet, and first and second blades interacting with the second magnet, wherein the first and second blades may adjust an amount of light having passed the iris unit in response to movement of second magnet.

The camera module may further include a support member coupled with the bobbin and the housing, wherein the support member may include a flexible first substrate, and wherein the first substrate may include a first coupling part coupled to an upper surface of a bottom plate of housing, a second coupling part coupled to a lower surface of bobbin and a connection part connecting the first coupling part and the second coupling part.

The second coupling part may include a body part coupled with the bobbin, and a mounting part extended upwardly from the body part, wherein the mounting part may be disposed with a first sensor detecting the second magnet.

The camera module may further comprise a second substrate electrically connected with the first coil and disposed at the housing, wherein the first substrate may be electrically connected with the second coil and the second substrate may be spaced apart from the first substrate.

The camera module may further comprise a second sensor disposed at the second substrate to detect the first magnet.

The connection part may include first to third extension parts arranged in parallel between the first coupling part and the second coupling part, and a round part roundly connecting the first to third extension parts.

The first coupling part may include a terminal, and the terminal of the first coupling part may be coupled with a PCB disposed underneath the housing by way of soldering.

The camera module may further comprise a guide ball interposed between the bobbin and the housing.

An optical device according to an exemplary embodiment may comprise: a body; a camera module disposed at the body; and a display part disposed at the body to output an image photographed by the camera module.

A camera module according to an exemplary embodiment may comprise: a housing; a bobbin disposed within the housing; a first magnet disposed at the bobbin; a first coil disposed at the bobbin; a first magnet disposed at the housing to face the first coil; a plurality of lenses coupled with the bobbin; and an iris unit coupled with the bobbin, wherein the plurality of lenses may include first and second lenses, each mutually spaced apart, and at least a portion of the iris unit may be interposed between the first and second lenses.

The iris unit may include a second coil, a second magnet facing the second coil, and first and second blades interacting with the second coil, wherein the first and second blades may adjust an amount of light having passed the iris unit in response to movement of the second coil.

A camera module according to an exemplary embodiment may comprise: a housing; a bobbin disposed within the housing; a magnet disposed at the bobbin; a coil disposed at the housing to face the magnet; a plurality of lenses accommodated into the bobbin; and an iris unit, at least a portion of which is accommodated into the bobbin, wherein the iris unit may integrally move with the bobbin, and the plurality of lenses may include a first lens disposed at one side of the iris unit, and a second lens disposed at the other side of the iris unit.

The camera module may further include a PCB disposed underneath the housing, and an image sensor coupled with the PCB and disposed underneath the plurality of lenses, wherein the first lens may be disposed at an upper side of the iris unit, and the second lens may be interposed between the iris unit and the image sensor.

The camera module may further include a flexible substrate coupled with the housing and the bobbin to be electrically connected to the coil.

Advantageous Effects

Through the exemplary embodiments, the present invention can realize a DSLR-level iris on a miniaturized lens driving mechanism.

In the present exemplary embodiments, the FPCB of iris actuator may be designed in a leaf spring to thereby minimize an FPCB interference influence of iris actuator.

BEST MODE

Figure 1:
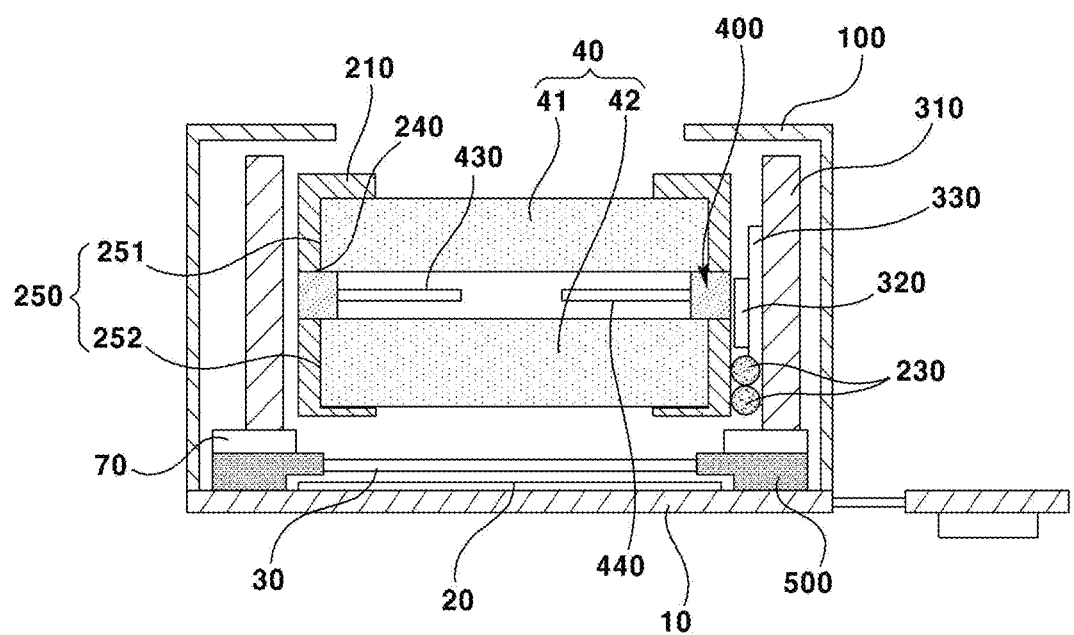
FIG. 1 is a conceptual drawing of a camera module according to a first exemplary embodiment of the present invention.

The exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted in explaining exemplary embodiments of the present invention.

In describing elements in the exemplary embodiments of the present invention, the terms, first, second, etc., may be used. These terms may be only used to distinguish one element from another element, and the nature, order or sequence is not restricted by these terms.

When an element is referred to as being "coupled to," or "connected to," another element, it should be appreciated that the element may be directly connected or coupled to the other element, or intervening elements may be present therebetween.

The optical axis direction used hereinunder is defined as an optical axis direction of a lens module coupled to a lens driving mechanism. Meantime, the "optical axis direction" may be interchangeably used with a vertical direction and a z axis direction.

The 'auto focus function' used hereinafter may be defined as a function of adjusting a focus relative to a subject by adjusting a distance to an image sensor through movement of lens module to an optical axis direction in response to a distance to the subject so that a clear image can be captured on the image sensor. Meantime, an 'auto focus' may be interchangeably used with an 'Auto Focus' and 'AF'.

Hereinafter, any one of a 'driving magnet part (220)' and a 'driving coil part (320)' may be called a 'first driving part' and the remaining other may be called a 'second driving part'.

Hereinafter, any one of an 'iris magnet (410)' and an 'iris coil (420)' may be called a 'third driving part', and the remaining other may be called a 'fourth driving part'.

Hereinafter, any one of a 'driving magnet part (220)' and an 'iris magnet (410)' may be called a 'first magnet' and the remaining other may be called a 'second magnet'.

Hereinafter, any one of a 'driving coil part (320)' and an 'iris coil (420)' may be called a 'first coil' and the remaining other may be called a 'second coil'.

Hereinafter, any one of an 'iris sensor part (700)' and an 'AF sensor part (800)' may be called a 'first sensor part' and the remaining other may be called a 'second sensor part'.

Hereinafter, configuration of an optical device according to an exemplary embodiment will be described.

The optical device according to an exemplary embodiment of the present invention may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may include any device capable of photographing an image or a photograph.

The optical device according to an exemplary embodiment may include a main body (not shown), a display part (not shown) displaying information by being disposed at one surface of the main body, and a camera module photographing an image or a photograph by being mounted on the main body.

Hereinafter, configuration of a camera module according to a first exemplary embodiment of the present invention will be described.

FIG. 1 is a conceptual drawing of a camera module according to a first exemplary embodiment of the present invention.

Referring to FIG. 1, the camera module according to a first exemplary embodiment of the present invention may include a lens driving mechanism, a PCB (10), an image sensor (20), an IR (Infrared) cut-off filter (30), a lens module (40), a controller (50) and a power applying part (60). In the first exemplary embodiment of the present invention, any one or more of the lens driving mechanism, the PCB (10), the image sensor (20), the IR (Infrared) cut-off filter (30), the lens module (40), the controller (50) and the power applying part (60) may be omitted.

The PCB (10) may support the lens driving mechanism. The PCB (10) may be mounted with an image sensor (20). The PCB (10) may be disposed at an inner upper side with an image sensor (20). The PCB (10) may be disposed at an outer upper side with a sensor holder (not shown). An upper side of sensor holder may be disposed with a lens driving mechanism. The PCB (10) may be disposed at an upper outer side with a lens driving mechanism. The PCB (10) may be disposed at an inner upper side with an image sensor (20). Through this structure, a light having passed the lens module (40) accommodated into an inner side of the lens driving mechanism may be irradiated on the image sensor (20) mounted on the PCB (10). The PCB (10) may supply a power to the lens driving mechanism. Meantime, the PCB (10) may be disposed with a controller (50) to control the lens driving mechanism.

The image sensor (20) may be mounted on the PCB (10). The image sensor (20) may be so disposed as to match the lens module (40) by way of optical axis, through which the image sensor (20) can obtain a light having passed the lens module (40). The image sensor (20) may output the irradiated light in an image. The image sensor (20) may be, for example, a CCD (charge coupled device), a MOS (metal oxide semi-conductor), a CPD and a CID. However, the types of image sensors (20) are not limited thereto.

The IR cut-off filter (30) may cut off a light of IR region from being incident on the image sensor (20). The IR cut-off filter (30) may be interposed between the lens module (40) and the image sensor (20). The IR cut-off filter (30) may be disposed at a holder member (not shown) that is separately provided from a base (500). However, the IR cut-off filter (30) may be also mounted at a through hole formed at a center of the base (500). The IR cut-off filter (30) may be formed with a film material or a glass material, for example. The infrared cut-off filter (30) may be formed by allowing an infrared cut-off coating material to be coated on a plate-shaped optical filter such as an imaging plane protection cover glass or a cover glass, for example. The infrared cut-off filter (30) may be an infrared absorption filter or an infrared reflection filter The lens module (40) may include a plurality of lenses. The plurality of lenses may be coupled with a bobbin (210). The plurality of lenses may be accommodated into the bobbin (210). The plurality of lenses may include a first lens and a second lens, each spaced apart from the other lens. At this time, at least a portion of an iris unit (400) may be interposed between the first lens and the second lens. When the PCB (10) is disposed underneath a housing (310) and the image sensor (20) coupled to the PCB (10) is disposed underneath the plurality of lenses, the first lens may be disposed at an upper side of the iris unit (400), and the second lens may be interposed between the iris unit (400) and the image sensor (20). The plurality of lenses may further include a third lens interposed between the first lens and the iris unit (400), and a fourth lens interposed between the second lens and the image sensor (20). A lens receptor (250) may include a first receptor (251) accommodating a first lens, and a second receptor (252) accommodating a second lens. At this time, the iris receptor (240) may be interposed between the first receptor (251) and the second receptor (252).

The lens module (40) may include a lens and a lens barrel. The lens module (40) may include one or more lenses and a lens barrel (not shown) accommodating the lenses. The lens accommodated into the lens barrel may be coupled with a bobbin (210). However, the lens barrel may be omitted and the lens may be directly coupled to the bobbin (210). The lens module (40) may move along with the lens driving mechanism by being coupled with the lens driving mechanism. The lens module (40) may be coupled to an inside of the lens driving mechanism. The lens module (40) may be screw-connected to the lens driving mechanism. The lens module (40) may be coupled to the lens driving mechanism by an adhesive (not shown). Meantime, a light having passed the lens module (40) may be irradiated on the image sensor (20).

The lens module (40) may include a first lens group (41) and/or a second lens group (42). The first lens group (41) may be accommodated into the first receptor (251) of bobbin (210). The second lens group (42) may be accommodated in the second receptor (252) of bobbin (210). The first lens group (41) and the second lens group (42) may be spaced apart. First and second blades (430, 440) of iris unit (400) may be interposed between the first lens group (41) and the second lens group (42). The first lens group (41) may be disposed at a bottom side with an iris unit (400). The second lens group (42) may be disposed at an upper surface with an iris unit (400).

The controller (50) may be mounted on a PCB (10). The controller (50) may be disposed at an outside of the lens driving mechanism. The controller (50) may individually control a direction, intensity and an amplitude of a current supplied to each element forming the lens driving mechanism. The controller (50) may perform of the camera module by controlling the lens driving mechanism. Furthermore, the controller (50) may control the iris unit (400) of the lens driving mechanism. The controller (50) may perform a feedback control of the auto focus function. To be more specific, the controller (50) may provide a more accurate auto focus function by controlling a current or a power supplied to a driving coil (320) by receiving a position of bobbin (210) detected by an AF sensor part (800). Furthermore, the controller (50) may accurately control the iris unit (400) in real time through position information of an iris magnet (410) at the iris unit (400).

A power source applying part (60) may supply a power to an iris coil (420) of the iris unit (400). The power source applying part (60) may supply a power to the iris coil (420) in response to control of the controller (50). Although the present exemplary embodiment has explained the power source applying part (60) as a separate configuration from the controller (50), the power source applying part (60) may not be divided or separated from the controller (50) by being embedded in the controller (50).

Hereinafter, configuration of lens driving mechanism according to a first exemplary embodiment will be described with reference to the accompanying drawings.

Figure 2:
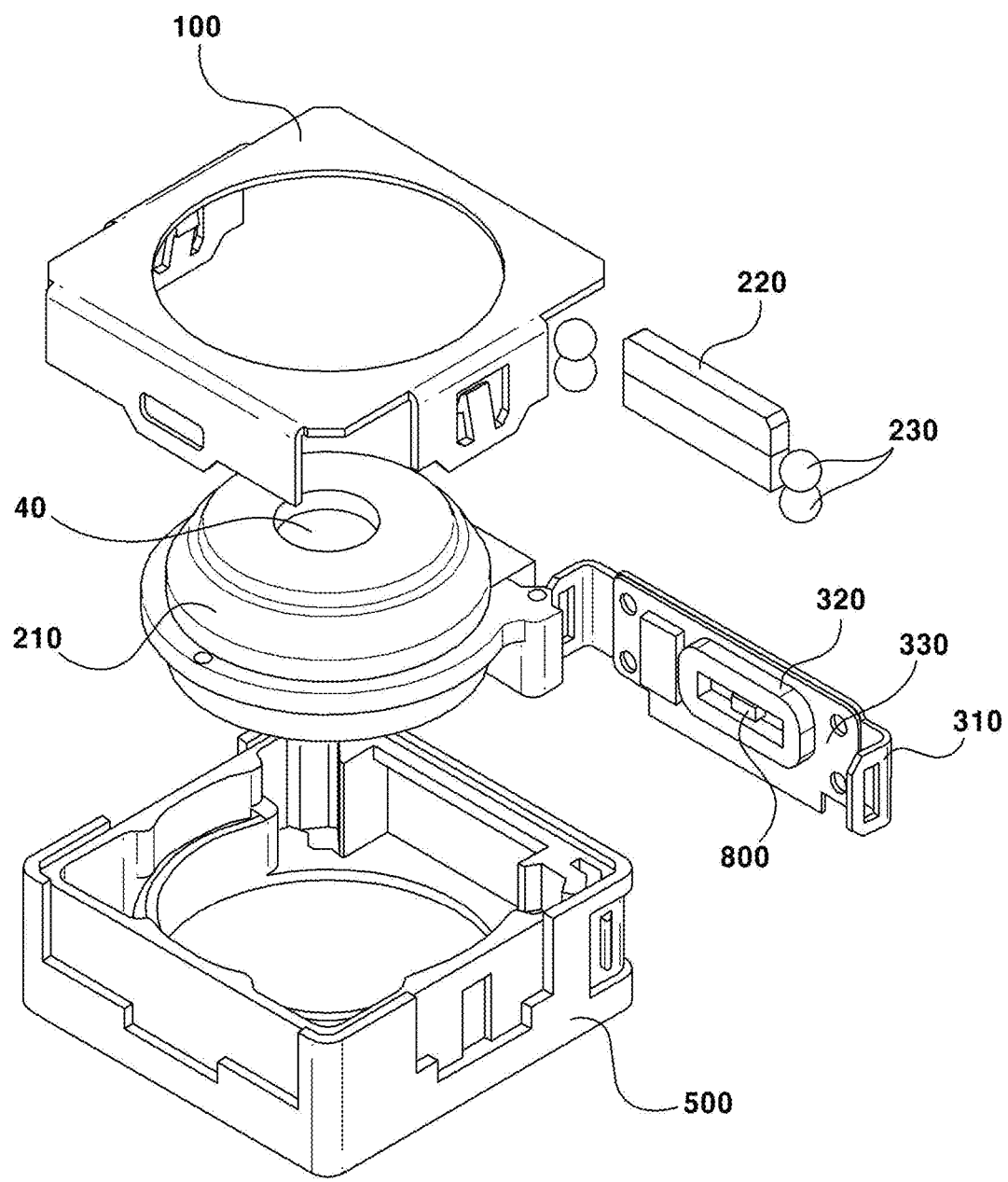
FIG. 2 is a concrete exploded perspective view illustrating a lens driving mechanism of FIG. 1.
Figure 3:
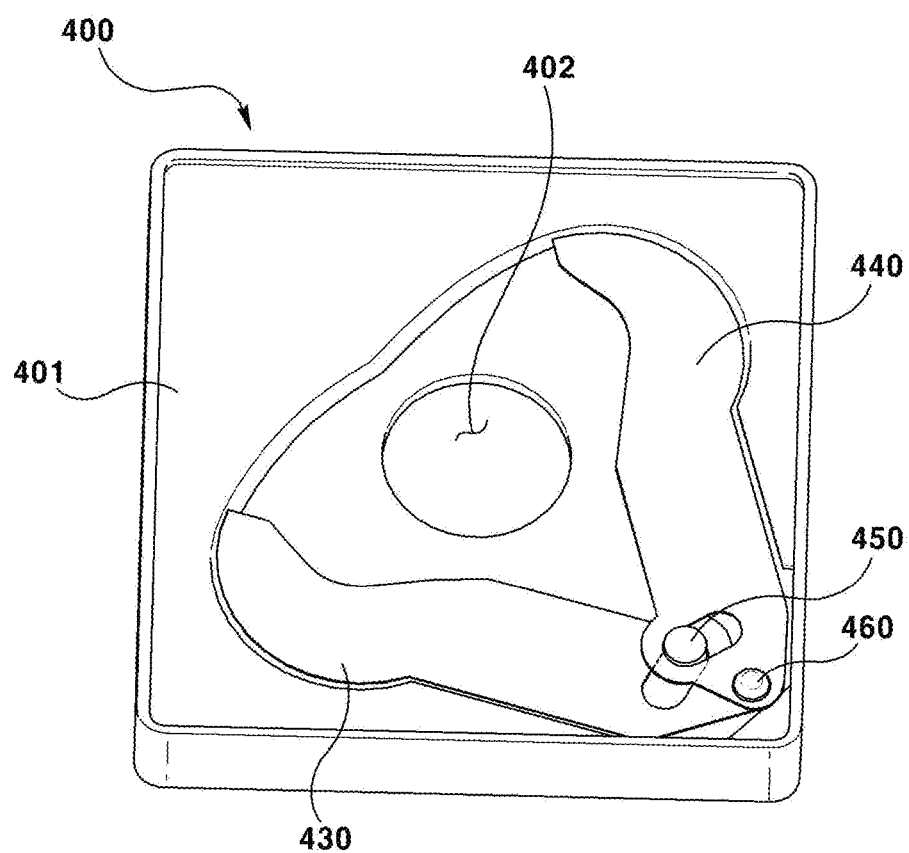
FIG. 3 is a concrete perspective view illustrating an iris unit of FIG. 1.
Figure 4:
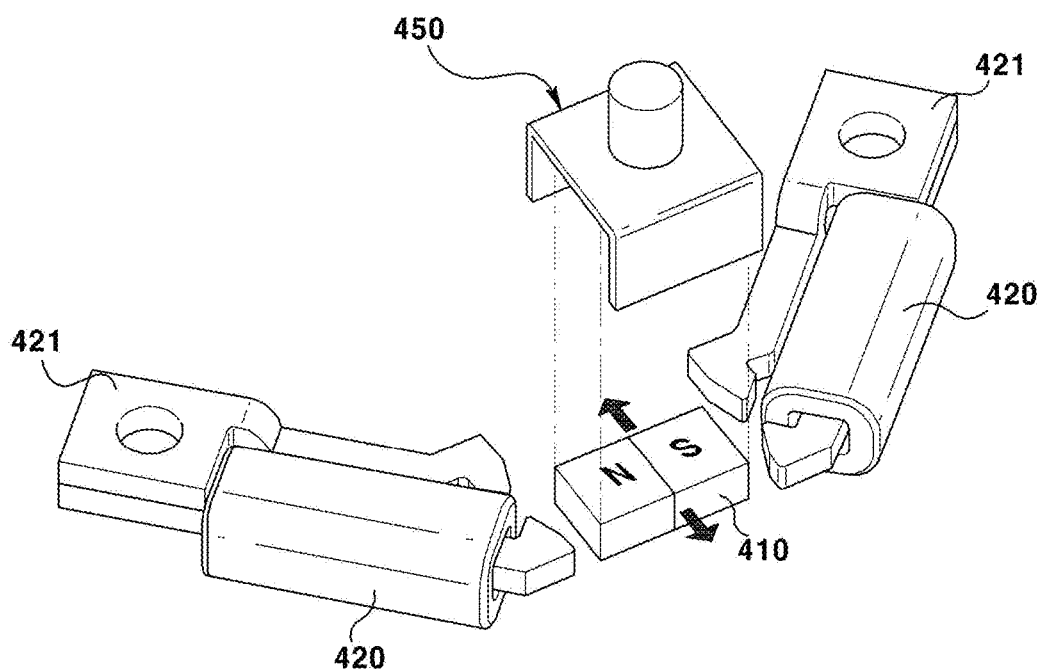
FIG. 4 is an exploded perspective view illustrating a driving of an iris unit according to FIG. 3.
Figure 5:
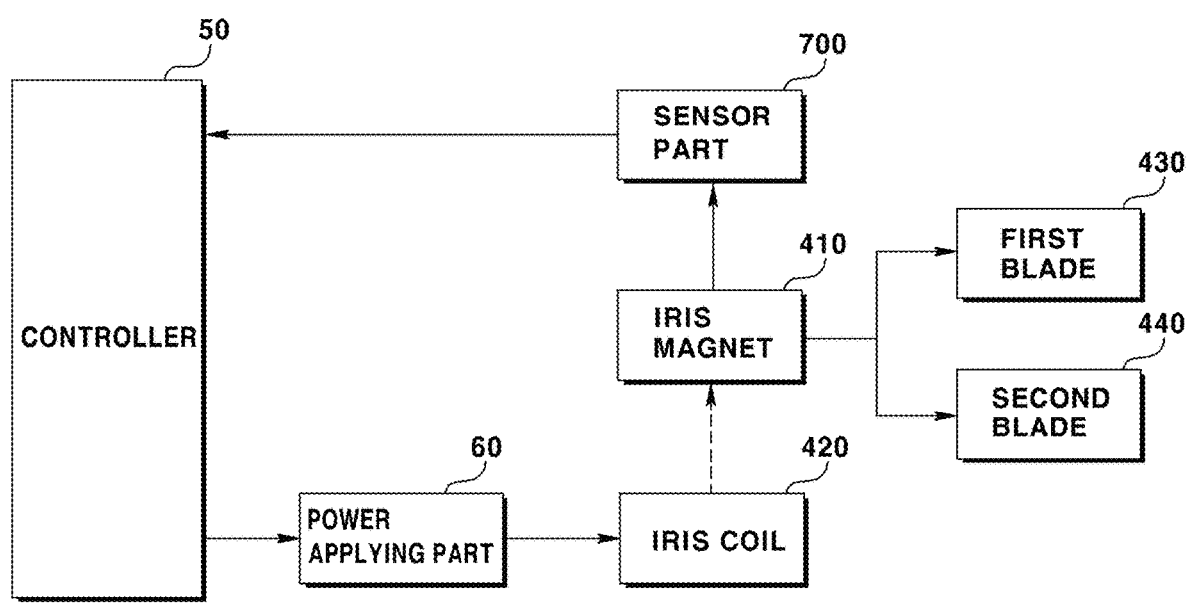
FIG. 5 is a block diagram illustrating an iris unit and related configuration thereof according to a first exemplary embodiment of the present invention.

FIG. 2 is a concrete exploded perspective view illustrating a lens driving mechanism of FIG. 1, FIG. 3 is a concrete perspective view illustrating an iris unit of FIG. 1, FIG. 4 is an exploded perspective view illustrating a driving of an iris unit according to FIG. 3, and FIG. 5 is a block diagram illustrating an iris unit and related configuration thereof according to a first exemplary embodiment of the present invention.

However, FIG. 1 is a conceptual drawing and may be different from FIGS. 2 to 5 for some elements. In this case, the elements illustrated in FIG. 1 may be understood as modifications of configurations illustrated in FIGS. 2 to 5 against the some different configurations.

The lens driving mechanism according to a first exemplary embodiment of the present invention may include a bobbin (210), a driving magnet part (220) and a guide ball (230). However, any one or more of the bobbin (210), the driving magnet part (220) and the guide ball (230) may be omitted from the lens driving mechanism according to the first exemplary embodiment of the present invention.

The bobbin (210) may be disposed at an inside of the housing (310). The bobbin (210) may be spaced apart from the housing (310). The bobbin (210) may be disposed at an inside of the housing (310). The bobbin (210) may be coupled with a driving magnet part (220). The bobbin (210) may be coupled by the iris unit (400). The bobbin (210) may be integrally formed with the iris unit (400). The bobbin (210) may move integrally with the iris unit (400). The bobbin (210) may be disposed at a bottom side of the cover member (100). The bobbin (210) may be accommodated into an inner space of cover member (100). The bobbin (210) may be coupled with the lens module (40). An inner peripheral surface of bobbin (210) may be coupled with an outer peripheral surface of lens module (40). The bobbin (210) may be movably supported relative to the base (500). The bobbin (210) may move to an optical axis direction relative to the housing (310).

The bobbin (210) may include an iris receptor (240), a lens receptor (250), a first driving part coupling part (not shown) and a guide ball coupling part (not shown).

The bobbin (210) may include an iris receptor (240) accommodating at least a portion of the iris unit (400). The iris receptor (240) may accommodate at least a portion of the iris unit (400). Through this structure, the bobbin (210) can integrally move with the iris unit (400). The iris receptor (240) may be formed by allowing a portion of one surface of bobbin (210) to be caved in. The iris receptor (240) may be formed by allowing a portion of an upper surface of bobbin (210) to be recessed downwardly. The iris receptor (240) may be formed by allowing a portion of a lateral surface of bobbin (210) to be recessed to the other side. The iris receptor (240) may be interposed between a first receptor (251) and a second receptor (252). Through this structure, the iris unit (400) may be interposed between a first lens group (41) and a second lens group (42). In this case, the iris unit (400) can integrally move with the first lens group (41) and the second lens group (42).

The bobbin (210) may include a lens receptor (250) formed at an inner side of the bobbin (210). The bobbin (210) may include at an inner side thereof an upper/bottom side-opened lens receptor (250). The bobbin (210) may include a lens receptor (250) formed at an inner side. The lens receptor (250) may be coupled by the lens module (40). The lens receptor (250) may be formed at an inner circumferential surface with a screw thread corresponding to a screw thread formed at an outer circumferential surface of lens module (40). That is, the lens receptor (250) may be screw-connected with the lens module (40). An adhesive may be interposed between the lens module (40) and the bobbin (210). At this time, the adhesive may be an epoxy hardened by UV or heat. That is, the lens module (40) and the bobbin (210) may be adhered by a UV hardening epoxy and/or heat-hardening epoxy.

The lens receptor (250) may include a first receptor (251) accommodated by the first lens group (41) of lens module (40) and a second receptor (252) accommodated by the second lens group (42) of lens module (40). An iris receptor (240) may be interposed between the first receptor (251) and the second receptor (252).

The bobbin (210) may include a first driving part coupling part disposed by a driving magnet part (220). The first driving part coupling part may be formed at an outside of the bobbin (210). The first driving part coupling part may be formed by allowing a portion of the outside of bobbin (210) to be recessed in a shape corresponding to that of the driving magnet part (220). The first driving part coupling part may be formed at an outside of the bobbin (210). The first driving part coupling part may be formed only on one surface of bobbin (210). The first driving part coupling part may be formed by allowing one surface of bobbin (210) to be recessed in a shape corresponding to that of the driving magnet part (220). The first driving part coupling part may accommodate at least one portion of the driving magnet part (220).

The bobbin (210) may include a guide ball coupling part coupled with a guide ball (230). The guide ball coupling part may be coupled with the guide ball (230). The guide ball coupling part may accommodate a portion of guide ball (230). The guide ball coupling part may rotatably accommodate the guide ball (230) by being roundly formed. The guide ball coupling part may be formed in a number corresponding to that of the guide ball (230). For example, the guide gall coupling part may be formed in the number of four (4) in order to respectively accommodate four (4) guide balls. Each of the plurality of guide ball coupling parts may be mutually spaced apart from the other.

The driving magnet part (220) may be disposed at the bobbin (210). The driving magnet part (220) may include a magnet. The driving magnet part (220) may be coupled with the bobbin (210). Through this structure, the driving magnet part (220) and the bobbin (210) can move integrally. The driving magnet part (220) may face a driving coil part (320).

Through this structure, the driving magnet part (220) can electromagnetically interact with the driving coil part (320). The driving magnet part (220) can move through the electromagnetic interaction with the driving coil part (320). The driving magnet part (220) and the driving coil part (320) may be disposed by being interchanged in each position as a modification. That is, the driving magnet part (220) may be disposed at the housing (310) and the driving coil part (320) may be disposed at the bobbin (210).

The guide ball (230) may be interposed between the bobbin (210) and the housing (310). The guide ball (230) may contact the bobbin (210) and the housing (310). Through this structure, the guide ball (230) can guide the movement of bobbin (210) when the bobbin (210) moves relatively to the housing (310). The guide ball (230) may guide a movement to a vertical direction (z axis direction) of bobbin (210). The guide ball (230) may be formed with a total of four (4), each two at one side, for example. However, the present invention is not limited thereto.

The lens driving mechanism according to a first exemplary embodiment of the present invention may comprise a housing (310), a driving coil part (320) and a substrate (330). However, any one or more of the housing (310), the driving coil part (320) and the substrate (330) may be omitted from the first exemplary embodiment of the present invention.

The housing (310) may be spaced apart from the bobbin (210). The housing (310) may be disposed at an outside of bobbin (210). The housing (310) may be coupled with the driving coil part (320). The housing (310) may be coupled with the base (500). The housing (310) may be coupled with a lateral side of base (500). The housing (310) may be formed with an insulation material, and may be formed with an injection in consideration of productivity. The housing (310) may be a plate-shaped member coupled to one lateral surface of base (500), for example.

The housing (310) may include an inner space, a second driving part coupling part and a guide ball coupling part.

The housing (310) may be opened at an upper side to movably accommodate at least a portion of bobbin (210) to an optical axis direction. The housing (310) may include, at an inside, an upper-opened inner space. The inner space may be movably disposed with the bobbin (210). That is, the inner space may be formed in a shape corresponding to that of the bobbin (210). Furthermore, an inner circumferential surface of housing (310) forming the inner space may be spaced apart from an outer circumferential surface of bobbin (210). The inner space thus described may be interpreted as a space formed by lateral plates of the housing (310) and the base (500).

The housing (310) may include a second driving part coupling part accommodating the driving coil part (320) by being formed at a lateral surface in a shape corresponding to that of the driving coil part (320). The second driving part coupling part may accommodate the driving coil part (320). The driving coil part (320) may be fixed to the second driving part coupling part by an adhesive (not shown). Meanwhile, the second driving part coupling part may be disposed at an inner circumferential surface of housing (310). This structure may provide an advantageous effect to an electromagnetic interaction between the driving coil part (320) and the driving magnet part (220) disposed at an inner side of the driving coil part (320).

The housing (310) may include a guide ball coupling part coupled with the guide ball (230). The guide ball coupling part may be coupled with the guide ball (230). The guide ball coupling part may accommodate a portion of the guide ball (230). The guide ball coupling part may rotatably accommodate the guide ball (230) by being roundly formed. The guide ball coupling part may be formed in a number corresponding to that of the guide ball (230). For example, the guide ball coupling part may be formed with four (4) pieces in order to respectively accommodate four guide balls (230). Each of the plurality of guide ball coupling parts may be mutually spaced apart from the other.

The driving coil part (320) may be disposed at the housing (310). The driving coil part (320) may be so formed as to face the driving magnet part (220). The driving coil part (320) may include a coil. Through this structure, when a power is applied to the driving coil part (320), the driving coil part (320) and the driving magnet part (220) may be electromagnetically interacted. That is, when a power is applied to the driving coil part (320), the driving magnet part (220) can move. At this time, the driving magnet part (220) may integrally move with the bobbin (210). As a modification, the driving magnet part (220) may be disposed at the housing (310), and the driving coil part (320) may be disposed at the bobbin (210).

The substrate (330) may be electrically connected with the driving coil part (320). The substrate (330) can supply an electric power to the driving coil part (320). The substrate (330) may be disposed at the housing (310). The substrate (330) may include a terminal part. The terminal part may be disposed at a bottom end of the substrate (330). The terminal part may be electrically connected with the PCB (10) using a soldering.

The lens driving mechanism according to a first exemplary embodiment may include a cover member (100).

The cover member (100) may accommodate the bobbin (210) at an inner space. The cover member (100) may be coupled with the base (500). The cover member (100) may form an exterior look of the lens driving mechanism. The cover member (100) may take a bottom-opened cubic shape. However, the present invention is not limited thereto.

The cover member (100) may be formed with a metal material, for example. To be more specific, the cover member (100) may be formed with a metal plate. In this case, the cover member (100) can shield an EMI (Electro Magnetic Interference). Because of the characteristics of the cover member (100) thus described may be called an EMI shield can. The cover member (100) may shield the electromagnetic waves generated from an outside of the lens driving mechanism from entering into the cover member (100). Furthermore, the cover member (100) may inhibit the electromagnetic waves generated from inside of the cover member (100) from being emitted to an outside of the cover member (100). However, the material of the cover member (100) is not limited thereto.

The cover member (100) may include an upper plate and a lateral plate. The cover member (100) may include a lateral plate coupled at a bottom end with the base (500). The cover member (100) may include an upper plate disposed at an upper side of bobbin (210). The bottom end of lateral plate of cover member (100) may be mounted on the base (500). The cover member (100) may be mounted on the base (500) by being closely contacted to a portion or all of lateral surface of base (500). The cover member (100) may protect an inner element from the outside shock or at the same time inhibit the infiltration of outside foreign object. As a modification, a bottom end at the lateral plate of cover member (100) may be directly coupled with the PCB (10) disposed at a bottom side of base (500).

The cover member (100) may include an opening exposing the lens module (40) by being formed at the upper plate. The opening may be formed with a shape corresponding to that of the lens module (40). The opening may be formed larger in size than a diameter of the lens module (40) to allow the lens module (40) to be assembled through the opening. Meantime, the light introduced into through the opening may pass through the lens module (40). At this time, the light having passed the lens module (40) may be obtained by the image sensor (20) as an image.

The lens driving mechanism according to a first exemplary embodiment of the present invention may include an iris unit (400).

The iris unit (400) may be coupled with the bobbin (210). The iris unit (400) may integrally move with the bobbin (210). The iris unit (400) may be interposed between a first lens group (41) and a second lens group (42).

The iris unit (400) may include an iris magnet (410). The iris unit (400) may include an iris coil (420) that is disposed opposite to the iris magnet (410). The iris unit (400) may include first and second blades (430, 440) interacting with the iris magnet (410). The iris unit (400) may include a slider (450) integrally moving with the iris magnet (410). The iris unit (400) may include a fixing axis part (460) providing a rotation center by fixing one side of the first and second blades (430, 440) to an iris housing (401). However, the configuration of iris unit (400) is not limited thereto. The iris unit (400) may be formed with any shape that can adjust an amount of light having passed the iris unit (400) in response to supply of power.

The iris magnet (410) may be movably disposed. The iris magnet (410) may face the iris coil (420). Through this structure, the iris magnet (410) can move when a power is supplied to the iris coil (420). When the iris magnet (410) moves, the slider (450) may also move. When the slider (450) moves, the first and second blades (430, 440) may rotatably move to mutually opposite directions about the fixing axis part (460). The position of iris magnet (410) may be detected by an iris sensor part (700). As a modification, the slider (450) may move along with the iris coil (420). That is, the first and second blades (430, 440) can adjust the amount of light having passed the iris unit (400) in response to movement of iris coil (420).

Figure 6:
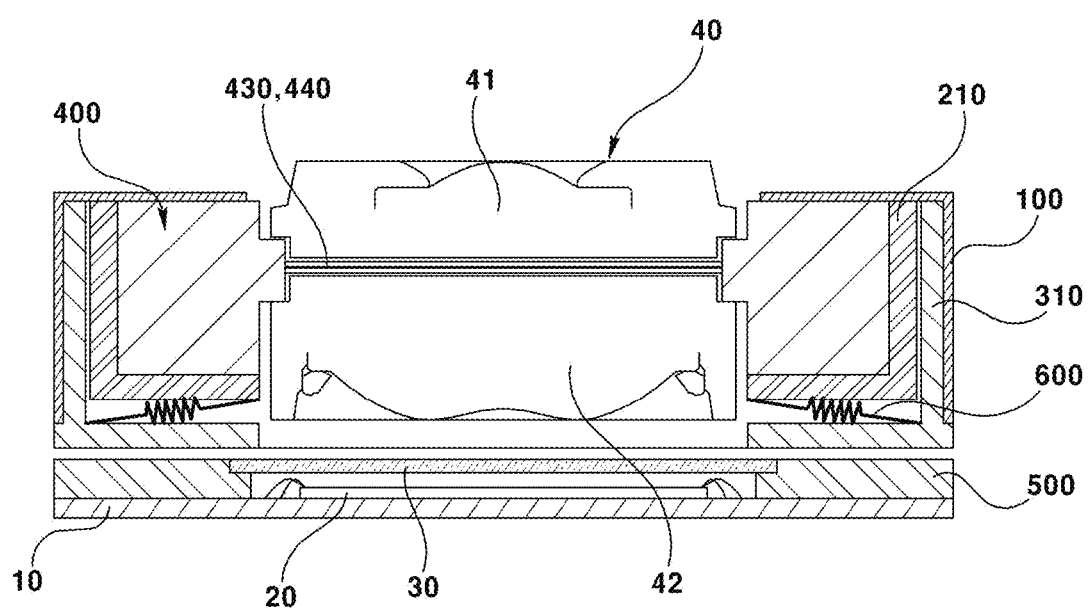
FIG. 6 is a conceptual drawing of a camera module according to a second exemplary embodiment of the present invention.
Figure 7:
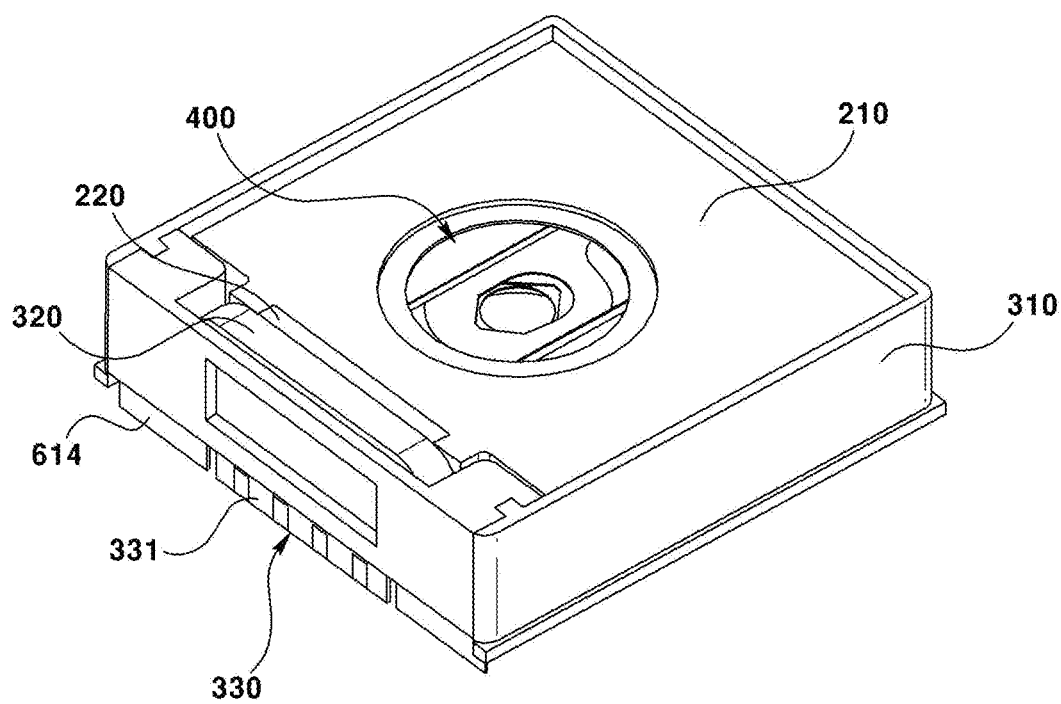
FIGS. 7 to 9 are perspective views of a partial configuration of lens driving mechanism according to a third exemplary embodiment of present invention.

The iris coil (420) may be so disposed as to face the iris magnet (410). The lens driving mechanism may include an element for supplying a power to the iris coil (420). The iris coil (420) may be electrically connected to a support member (600) as illustrated in FIG. 6. Alternatively, the iris coil (420) may be electrically connected to a substrate (330) as illustrated in FIG. 7. When a power is supplied to the iris coil (420), a magnetic field is generated to move the iris magnet (410) through an electromagnetic interaction with the iris magnet (410). The iris coil (420) may be disposed at a rod (421). The rod (421) may be disposed respectively at both sides of iris magnet (410), for example.

When the iris magnet (410) moves, the first and second blades (430, 440) move to adjust an amount of light having passed the iris unit (400). At this time, the first and second blades (430, 440) can adjust an amount of light having passed the iris unit (400) by adjusting a size of through hole through which the light passes. The first and second blades (430, 440) may move to mutually opposite directions in response to the movement of the iris magnet (410). The first and second blades (430, 440) can adjust an amount of light passing through the lens module (40) in response to the movement of iris magnet (410). To be more specific, when a power is supplied to the iris coil (420), a surrounding of rod (421) becomes an electronic magnet to move the iris magnet (410) and to allow the slider (450) to integrally move along with the iris magnet (410), whereby the first and second blades (430, 440) can rotatably move to mutually opposite directions about the fixing axis part (460) in response to the movement of slider (450). Through this structure, the first and second blades (430, 440) can adjust an amount of light passing through the through hole (402) formed at the iris housing (401). The first and second blades (430, 440) can completely open the through hole (402) and can close the through hole (402) step by step. Although the foregoing discussion has explained that the first and second blades (430, 440) are integrally controlled by the iris magnet (410), the present invention is not limited thereto. The first and second blades (430, 440) may be individually controlled.

Although the foregoing has explained that the bobbin (210) and the iris unit (400) are separately formed, the bobbin (210) may be omitted and the iris unit (400) may be directly coupled by the lens module (40). In other words, the iris unit (400) may be accommodated by the lens module (40).

The lens driving mechanism according to a first exemplary embodiment of the present invention may include a base (500).

The base (500) may accommodate the bobbin (210) therein. The base (500) may be coupled with the cover member (100). A lateral surface of one side at the base (500) may be coupled by the housing (310). The base (500) may be disposed at the PCB (10). The base (500) may be fixed to the PCB (10) by an active alignment adhesive (70). That is, the base (500) may be fixed to the PCB (10) through an active alignment process. At this time, the active alignment process is a process to align an optical axis of lens module (40) fixed to the lens driving mechanism and an optical axis of image sensor (20) of the PCB (10), where the active alignment adhesive (70) can be initially hardened by the ultraviolet (UV) rays and finally hardened by heat. That is, the base (500) is initially hardened to the PCB (10) while an optical axis of lens module (40) and an optical axis of image sensor (20) are aligned, where a camera module under this state may be finally hardened in an oven and the assembly can be completed. Alternatively, the base (500) may be coupled with the housing (310) by the active alignment adhesive (70). The base (500) may be disposed at a bottom side of bobbin (210). The base (500) may be disposed at a bottom side of housing (310). A bottom side of base (500) may be disposed with the PCB (10). The base (500) may perform a sensor holder function to protect the image sensor (20) mounted with the PCB (10). The base (500) may be mounted with an IR cut-off filter (30).

The lens driving mechanism according to a first exemplary embodiment of the present invention may include an iris sensor part (700).

The iris sensor part (700) may detect a position of iris magnet (410). The iris sensor part (700) may include a sensor. The iris sensor part (700) may be a Hall sensor, for example. The iris sensor part (700) may detect the intensity of magnet field of the iris magnet (410). The iris sensor part (700) may electrically conduct with the support member (600). Information on the iris magnet (410) detected by the iris sensor part (700) may be transmitted to the controller (50).

The lens driving mechanism according to a first exemplary embodiment of the present invention may comprise an AF sensor part (800).

The AF sensor part (800) may be used for auto focus feedback. The AF sensor part (800) may include a sensor. The AF sensor part (800) may detect a position of a driving magnet part (220) disposed at the bobbin (210). The AF sensor part (800) may be disposed at a substrate (330) disposed at the housing (310). The AF sensor part (800) may be disposed at a space of a closed-curve type driving coil part (320). The AF sensor part (800) may include a Hall sensor, for example. At this time, the Hall sensor may detect a position of the driving magnet part (220) by sensing a magnetic field of the driving magnet part (220).

Hereinafter, configuration of camera module according to a second exemplary embodiment of the present invention will be described.

FIG. 6 is a conceptual drawing of a camera module according to a second exemplary embodiment of the present invention.

Referring to FIG. 6, the camera module according to a second exemplary embodiment of the present invention may include a lens driving mechanism, a PCB (10), an image sensor (20), an IR cut-off filter (30), a lens module (40) and a controller (50). However, any one or more of the lens driving mechanism, the PCB (10), the image sensor (20), the IR cut-off filter (30), the lens module (40) and the controller (50) in the camera module according to the second exemplary embodiment of the present invention may be omitted. Meantime, the lens driving mechanism, the PCB (10), the image sensor (20), the IR cut-off filter (30), the lens module (40) and the controller (50) in the camera module according to the second exemplary embodiment of the present invention may be analogically applied from the explanation of the first exemplary embodiment of the present invention. Hereinafter, differences of camera module according to the second exemplary embodiment from the first exemplary embodiment of the present invention will be centered in explanation thereof.

In the second exemplary embodiment, the cover member (100) may be coupled with the housing (310). This configuration is different from the first exemplary embodiment in that the cover member (100) is coupled with the PCB (10). However, the differences are not limited to the first and second exemplary embodiments. The cover member (100) may be coupled with the base (500).

In the second exemplary embodiment, a support member (600) may be disposed. The support member (600) in the second exemplary embodiment may replace the guide ball (230) of the first exemplary embodiment. The support member (600) may movably support the bobbin (210). Meantime, the support member (600) will be explained in detail hereinafter with reference to FIGS. 7 to 9.

In the second exemplary embodiment, a lower surface of housing (310) may be extensively formed over an area of the base (500). At this time, a lower surfaced of housing (310) and an upper surface of base may be adhered by an adhesive.

Hereinafter, configuration of a lens driving mechanism according to a third exemplary embodiment of the present invention will be described.

Figure 8:
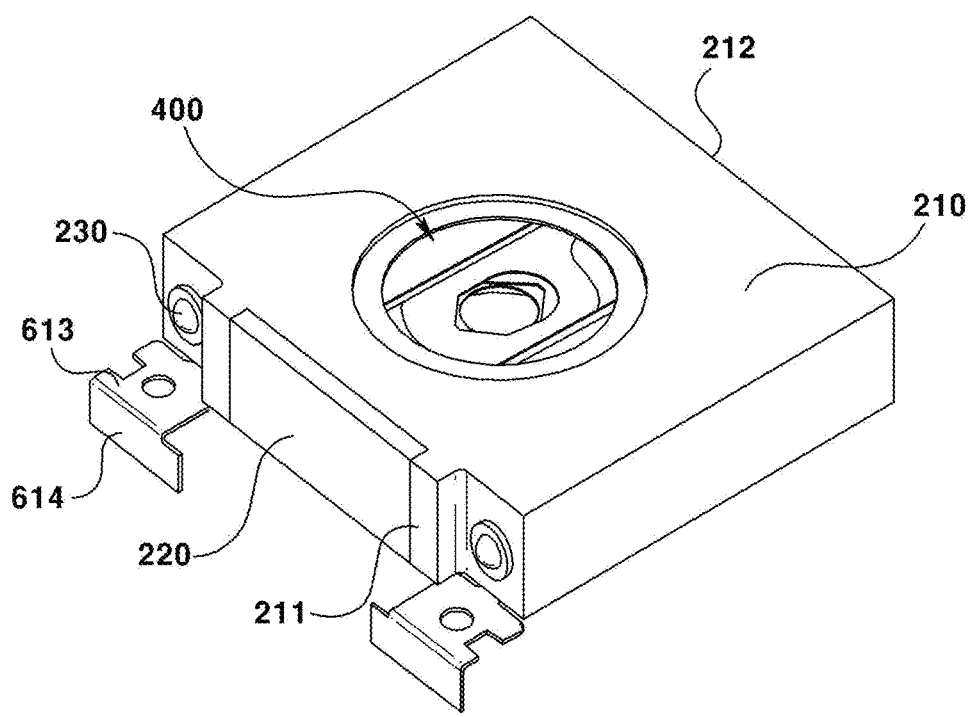
Figure 9:
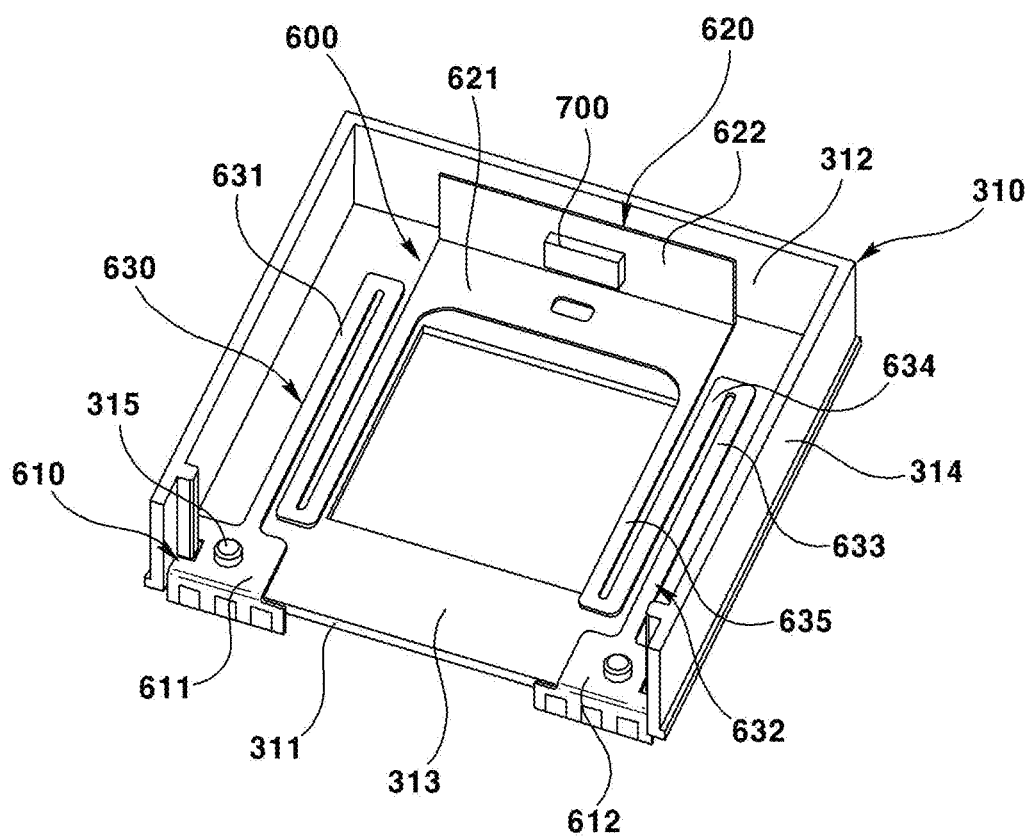

FIGS. 7 to 9 are perspective views of a partial configuration of lens driving mechanism according to a third exemplary embodiment of present invention.

The lens driving mechanism according to the third exemplary embodiment of present invention may include a cover member (100), a bobbin (210), a driving magnet part (220), a guide ball (230), a housing (310), a driving coil part (320), a substrate (330), an iris unit (400) and an iris sensor part (700). However, any one or more of the cover member (100), the bobbin (210), the driving magnet part (220), the guide ball (230), the housing (310), the driving coil part (320), the substrate (330), the iris unit (400) and the iris sensor part (700) according to the third exemplary embodiment of present invention may be omitted. Meantime, the cover member (100), the bobbin (210), the driving magnet part (220), the guide ball (230), the housing (310), the driving coil part (320), the substrate (330), the iris unit (400) and the iris sensor part (700) according to the third exemplary embodiment of present invention may be analogically applied from the explanation of the first exemplary embodiment of the present invention. Hereinafter, differences of lens driving mechanism according to the third exemplary embodiment from the first exemplary embodiment of the present invention will be centered in explanation thereof.

The bobbin (210) in the third exemplary embodiment may be formed in a cubic shape. The bobbin (210) may include a first lateral part (211) facing a first lateral surface part (311) of housing (310), and a second lateral part (212) facing a second lateral surface part (312) of housing (310). That is, the second lateral part (212) may be disposed opposite to the first lateral part (211). The first lateral part (211) of bobbin (210) may be disposed with a driving magnet part (220). The first lateral part (211) of bobbin (210) may be disposed with a guide ball (230). The driving magnet part (220) may be disposed at an inside of guide ball (230). The second lateral part (212) of bobbin (210) may be disposed with an iris magnet (410) of the iris unit (400). Through this structure, the iris sensor part (700) disposed at a second lateral surface part (312) side of the housing (310) can sense the iris magnet part (410). However, the iris magnet (410) may not be exposed to an outside of the bobbin (210).

The bobbin (210) may include a support member coupling part coupled with the support member (600). The coupling part may be coupled with a second coupling part (620) of support member (600). For example, a lug (not shown) of the support member coupling part may be coupled by being inserted into a groove or a hole (not shown) of the second coupling part (620) of support member (600). At this time, the lug of the support member coupling part may fix the support member by being heat-melted in a state of being inserted into the hole of the second coupling part (620).

The housing (310) may include a first lateral surface part (311), and a second lateral surface part (312) disposed opposite to the first lateral surface part (311). The second lateral surface part (311) may be disposed opposite to the first lateral surface part (311). The first lateral surface part (311) may face the first lateral part (211) of bobbin (210). The second lateral surface part (312) may face the second lateral part (212) of bobbin (210).

The housing (310) may include a bottom plate (313) and a lateral plate (314). The bottom plate (313) may be coupled with the support member (600). The bottom plate (313) may selectively support a bottom side of bobbin (210). That is, when the bobbin (210) maximally descends, a lower surface of bobbin (210) may be supported by a bottom plate (313) of housing (313). In other words, the bottom plate (313) can function as a bottom stopper of bobbin (210). The lateral plate (314) may be formed by being extended from the bottom plate (313) to an upper side. The height of lateral plate (314) may be higher than that of the bobbin (210). A portion of the lateral plate (314) of housing (310) may be coupled by way of attachable and detachable manner. For example, the lateral plate (314) coupled by the substrate (330) in the plurality of lateral plates (314) of the housing (310) may be coupled to the bottom plate (313) and the other lateral plate (314) by way of attachable and detachable method. At this time, the attachable and detachable method may be implemented by way of sliding coupling. Through this structure, assembly of substrate (330) to the housing (310) can be easily implemented.

The housing (310) may include a support member coupling part coupled with the support member (600). For example, the support member coupling part may include a coupling lug (315). The coupling lug (315) may be coupled by being inserted into a groove or a hole (not shown) of the first coupling part (610) of support member (600). At this time, the coupling lug (315) may fix the support member (600) by being heat-melted in a state of being inserted into a hole of first coupling part (610). The coupling lug (315) may be formed at an upper surface of bottom plate (313) of housing (310).

The substrate (330) may be coupled to an inner surface of lateral plate (314) of housing (310). The substrate (330) may be spaced apart from the support member (600). That is, the substrate (330) may not be electrically connected with the support member (600).

The lens driving mechanism according to the third exemplary embodiment may include a support member (600).

As a comparative example, when the FPCB of iris actuator is bent in a 'U' shape to be disposed at a lateral side of the iris actuator, spring strength of FPCB becomes very high to provide a difficulty in control because the strength of FPCB differs in response to the bending degree.

The support member (600) may be an FPCB (Flexible Printed Circuit Board) of iris actuator {may include an iris magnet (410) and an iris coil (420) in the present invention} generating a driving force from the iris unit (400) being designed in a shape of a leaf spring. Through this structure, interference influence of FPCB of the iris actuator may be reduced in the present exemplary embodiment in comparison with the comparative exemplary embodiment.

The support member (600) may be coupled with the bobbin (210). The support member (600) may be coupled with the housing (310). The support member (600) may be coupled with the bobbin (210) and the housing (310). The support member (600) may be formed in a flexible circuit board. However, the present invention is not limited thereto. The support member (600) may have elasticity on at least a portion thereof. The support member (600) may be an elastic member like a leaf spring, as a modification. The support member (600) may be electrically connected with the iris coil (420). The support member (600) may supply a power supplied from an outside through the terminal part (614) to the iris coil (420). Alternatively, the support member (600) may transmit the detected information to the iris sensor part (700) through the terminal part (614).

The support member (600) may include a first coupling part (610) coupled with the housing (310). The support member (600) may include a second coupling part (620) coupled with the bobbin (210). The support member (600) may include a connection part (630) connecting the first coupling part (610) and the second coupling part (620).

The first coupling part (610) may be coupled with the housing (310). The first coupling part (610) may be coupled to the first lateral surface part (311) of housing (310). The first coupling part (610) may be coupled with an upper surface of bottom plate (313) of housing (310). The first coupling part (610) may be coupled with the coupling lug (315) of housing (310).

The first coupling part (610) may include first and second coupling bodies (611, 612), each mutually spaced apart from the other. Each of the first and second coupling bodies (611, 612) may be formed with a terminal part (614). Through this structure, a more number of conductive lines can be exposed to an outside. A substrate (330) may be interposed between the first and second coupling bodies (611, 612). For example, each of the first and second coupling bodies (611, 612) may be formed three terminals, each mutually spaced apart from the other. That is, the first coupling part (610) may include a total six (6) terminals, each mutually spaced apart from the other. At this time, two terminals may be used to supply a power to the iris coil (420), and the remaining four terminals may be used in order to supply a power to the iris sensor part (700) and to transmit/receive information.

The first coupling part (610) may include a body part (613) coupled to an upper surface of the bottom plate (313) of the housing (310). The body part (613) may be coupled to a coupling lug (315) of the housing (310). At least a portion of the body part (613) may surface-contact an upper surface of bottom plate (313) of housing (310). The first coupling part (610) may include a terminal part (614) extended by being bent to a bottom side from the body part (613). The terminal part (614) may be electrically connected with the PCB (10). The coupling between the terminal part (614) and the PCB (10) may be implemented by soldering. The first coupling part (610) may include a terminal. The terminal of the first coupling part (610) may be coupled with the PCB (10) disposed underneath the housing (310) by way of soldering.

The second coupling part (620) may include a body part (621) coupled with the bobbin (210), and a mounting part (622) upwardly bent by being extended from the body part (621).

The second coupling part (620) may be coupled with the bobbin (210). The second coupling part (620) may be coupled with a second lateral part (212) of bobbin (210). That is, the second coupling part (620) may be disposed opposite to the first coupling part (610). In other words, the second coupling part (620) and the first coupling part (610) may be disposed by being spaced apart along a lateral side of housing (310).

The second coupling part (620) may include a body part (623) coupled to a lower surface of bobbin (210). The body part (623) may be coupled with a lug of bobbin (210). At least a portion of body part (623) may surface-contact a lower surface of bobbin (210). The second coupling part (620) may include a mounting part (624) extended by being upwardly bent from the body part (623). The mounting part (624) may be mounted with the iris sensor part (700). At least a portion of mounting part (624) may surface-contact a lateral surface of bobbin (210). The iris sensor part (700) may be disposed at the mounting part (624) of second coupling part (620) of support member (600).

The connection part (630) may connect the first coupling part (610) and the second coupling part (620). The connection part (630) may be a portion that is elastically deformed in response to movement of bobbin (210). That is, the connection part (630) may have elasticity. The connection part (630) may be bent at least twice. The connection part (630) may be roundly extended at least at a portion thereof. The connection part (630) may include first to third extension parts (633, 634, 635) disposed mutually in parallel between the first coupling part (610) and the second coupling part (620), and a round part roundly extending the first to third extension parts (633, 634, 635). The connection part (630) may include a first extension part (633) extended to a second coupling part (620) side from the first coupling part (610). The connection part (630) may include a second extension part (634) extended to a first coupling (610) side by being bent from the first extension part (633). The connection part (630) may include a third extension part (635) extended to a second coupling part (620) side by being bent from the second extension part (634). At this time, the first extension part (633), the second extension part (634)

and the third extension part (635) may be overlapped over the most part of lengthwise direction section. In this case, a length of the extension part (630) may be maximized to advantageously broaden a width of connection part (630) design-wise. That is, a plurality of conductive lines, each mutually spaced apart from the other, may be formed through the connection part (630). For example, a total of six (6) conductive lines may be formed through the connection part (630).

The connection part (630) may include first and second connection bodies (631, 632), each mutually spaced apart from the other. The first connection body (631) may connect the first coupling body (611) and the second coupling body (620). The second connection body (632) may connect the second coupling body (622) and the second coupling part (620). For example, each of the first coupling body (631) and the second coupling body (632) may be formed with three conductive lines, each mutually spaced apart from the other. That is, the connection part (630) may include a total of six (6) conductive lines, each mutually spaced apart from the other. At this time, two conductive lines may be electrically connected to the iris coil (420), and the remaining four conductive lines may be connected to the iris sensor part (700).

Although the foregoing discussion has explained about the first to third exemplary embodiments, using the drawings, a modification according to the present invention may be of a combined shape in which any one exemplary embodiment and another exemplary embodiment in the three exemplary embodiments are combined.

Now, hereinafter, an operation of camera module according to an exemplary embodiment will be explained.

First, an auto focus function of camera module according to an exemplary embodiment will be explained through the first exemplary embodiment. When a power is supplied to the driving coil part (320), the driving magnet part (220) may perform a movement relative to the driving coil part (320) in response to an electromagnetic interaction between the driving coil part (320) and the driving magnet part (220). At this time, the bobbin (210) coupled by the driving magnet part (220) may integrally move with the driving magnet part (220). That is, the bobbin (210) coupled to an inside of the lens module (40) may move to an optical axis direction (up/down direction, vertical direction) relative to the housing (310). This movement of bobbin (210) may result in the lens module (40) nearing to or distancing from the image sensor (20), whereby a focus adjustment relative to a subject can be implemented by supplying a power to the driving coil part (320) according to the present exemplary embodiment.

Meantime, the camera module according to the first exemplary embodiment of the present invention may be applied with an auto focus feedback in order to implement a more accurate realization of auto focus function. The AF sensor part (800) disposed at the housing (310) and formed in the form of a Hall sensor may detect a magnetic field of the driving magnet part (220) fixed to the bobbin (210). Thus, when the bobbin (210) performs a relative movement to the housing (310), the AF sensor part (800) may detect movement of bobbin (210) to a z axis direction or a real time position of bobbin (210) and transmit a detection value to the controller (50). The controller (50) may determine whether to perform an additional movement relative to the bobbin (210) through the received detection value. This process is generated in real time, whereby the auto focus function of camera module according to the first exemplary embodiment can be more accurately implemented through the auto focus feedback.

Furthermore, an iris can be driven in the camera module according to the first exemplary embodiment. When an electric power is supplied to the iris coil (420), the iris magnet (410) can move relative to the iris coil (420) in response to an electromagnetic interaction between the iris coil (420) and the iris magnet (410). At this time, the first and second blades (430, 440) interacting with the iris magnet (410) mutually move to an opposite direction to thereby adjust the size of through hole through which a light passes. That is, an amount (diameter of light) of light incident on the lens module (40) can be adjusted by supplying an electric power to the iris coil (420) in the present exemplary embodiment.

Furthermore, a feedback control to the iris driving may be applied to the camera module according to the present invention. The feedback control function to the iris driving of camera module according to the present exemplary embodiment will be explained through the third exemplary embodiment.

The iris sensor part (700) disposed at the support member (600) may detect a position of the iris magnet (410), and the position of iris magnet (410) detected by the iris sensor part (700) may be transmitted to the controller (50). The controller may determine whether to perform an additional movement relative to the first and second blades (430, 440) of the iris unit (400) through the received detection value. This process is generated in real time, such that the iris driving can be more accurately implemented in the present exemplary embodiment.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention.

Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments.

The scope of protection of the present invention should be interpreted by the following claims and all technical ideas within the equivalent scope should be interpreted as being included in the scope of right of the present invention.

The invention claimed is:

1. A camera module comprising:
   a base;
   a bobbin;
   a lens module coupled to the bobbin;
   an iris unit coupled to the lens module;
   a first magnet disposed on the bobbin;
   a substrate disposed on the base; and
   a first coil disposed on the substrate and facing the first magnet,
   wherein the iris unit comprises first and second blades, a second magnet, and a second coil facing the second magnet, and
   wherein the iris unit is configured to move together with the lens module.

2. The camera module of claim 1, wherein the lens module comprises a lens disposed below the iris unit.

3. The camera module of claim 2, wherein the iris unit is disposed on the lens of the lens module, and wherein the first and second blades of the iris unit are spaced apart from the lens of the lens module.

4. The camera module of claim 2, wherein the lens module comprises another lens disposed on the iris unit.

5. The camera module of claim 2, comprising:
   a printed circuit board (PCB); and
   an image sensor disposed on the PCB,
   wherein the lens of the lens module is disposed between the iris unit and the image sensor, and
   wherein the lens of the lens module comprises a plurality of lenses.

6. The camera module of claim 1, wherein the lens module comprises a lens barrel and a plurality of lenses disposed in the lens barrel.

7. The camera module of claim 1, wherein the first and second blades are configured to adjust an amount of light having passed the iris unit by an interaction of the second magnet and the second coil.

8. The camera module of claim 1, comprising a housing disposed on the base and a flexible substrate elastically connecting the bobbin and the housing,
   wherein the flexible substrate comprises a first coupling part coupled to an upper surface of a bottom plate of the housing, a second coupling part coupled to a lower surface of the bobbin, and a connection part connecting the first coupling part and the second coupling part.

9. The camera module of claim 8, wherein the second coupling part comprises a body part coupled with the bobbin, and a mounting part extending upwardly from the body part, and
   wherein the mounting part is disposed with a first sensor that detects the second magnet.

10. The camera module of claim 1, wherein the substrate is electrically connected with the second coil.

11. The camera module of claim 1, comprising a second sensor disposed on the substrate and detecting the first magnet.

12. The camera module of claim 11, wherein the first coil comprises a first part, a second part disposed below the first part and a connection part connecting the first part and the second part, and
    wherein the second sensor is disposed between the first part and the second part of the first coil.

13. The camera module of claim 1, comprising a cover member comprising an upper plate and a lateral plate extending from the upper plate, and
    wherein the base is coupled with the lateral plate of the cover member.

14. The camera module of claim 1, comprising a ball disposed between the base and the bobbin, and
    wherein the ball is configured to guide the bobbin when the bobbin moves in an optical axis direction.

15. The camera module of claim 1, wherein the iris unit, the lens module and the bobbin integrally move along an optical axis when a current applied to the first coil.

16. An optical device, comprising:
    a body;
    a camera module of claim 1 disposed on the body; and
    a display part disposed on the body to output an image photographed by the camera module.

17. A camera module comprising:
    a base;
    a mover configured to move in an optical axis direction;
    a ball disposed between the base and the mover;
    a first magnet disposed on the mover;
    a substrate disposed on the base; and
    a first coil disposed on the substrate and facing the first magnet,
    wherein the mover comprises a bobbin, a lens module coupled to the bobbin, and an iris unit coupled to the lens module,
    wherein the iris unit comprises first and second blades, a second magnet and a second co it facing the second magnet.

18. The camera module of claim 17, wherein the iris unit, the lens module and the bobbin integrally move when a current applied to the first coil.

19. The camera module of claim 18, wherein the lens module comprises a lens,
    wherein the iris unit is disposed on the lens, and
    wherein the ball is configured to support the mover when the mover moves in the optical axis direction.

20. A camera module comprising:
    a housing;
    a bobbin disposed in the housing;
    a first magnet disposed on the bobbin;
    a first coil disposed on the housing and facing the first magnet;
    a plurality of lenses coupled to the bobbin;
    an iris unit coupled to the bobbin; and
    a flexible substrate elastically connecting the bobbin and the housing,
    wherein the plurality of lenses comprises first and second lenses,
    wherein at least a portion of the iris unit is disposed between the first lens and the second lens,
    wherein the iris unit comprises a second magnet, a second coil facing the second magnet, and first and second blades interacting with the second magnet,
    wherein the flexible substrate comprises a first coupling part coupled to the housing, a second coupling part coupled to the bobbin, and a connection part connecting the first coupling part and the second coupling part, and
    wherein the connection part comprises first to third extension parts disposed in parallel between the first coupling part and the second coupling part, and a round part roundly connecting the first to third extension parts.

* * * * *